US009850140B2

(12) United States Patent
DiSalvo, Jr. et al.

(10) Patent No.: US 9,850,140 B2
(45) Date of Patent: Dec. 26, 2017

(54) CONDUCTING METAL OXIDE AND METAL NITRIDE NANOPARTICLES

(75) Inventors: Francis J. DiSalvo, Jr., Ithaca, NY (US); Chinmayee V. Subban, Ithaca, NY (US)

(73) Assignee: Cornell University, Ithaca, NY (US)

( * ) Notice: Subject to any disclaimer, the term of this patent is extended or adjusted under 35 U.S.C. 154(b) by 914 days.

(21) Appl. No.: 13/321,325

(22) PCT Filed: May 20, 2010

(86) PCT No.: PCT/US2010/035650
§ 371 (c)(1),
(2), (4) Date: Feb. 1, 2012

(87) PCT Pub. No.: WO2010/135576
PCT Pub. Date: Nov. 25, 2010

(65) Prior Publication Data
US 2012/0122019 A1    May 17, 2012

Related U.S. Application Data

(60) Provisional application No. 61/180,285, filed on May 21, 2009.

(51) Int. Cl.
*H01B 1/08*   (2006.01)
*H01B 1/06*   (2006.01)
(Continued)

(52) U.S. Cl.
CPC ............ *C01G 23/047* (2013.01); *B82Y 30/00* (2013.01); *C01G 25/02* (2013.01); *C01G 33/00* (2013.01);
(Continued)

(58) Field of Classification Search
CPC ........ H01B 1/08; C01G 23/04; C01G 23/047; H01L 31/0264; C01B 21/0602; C01B 21/0768
See application file for complete search history.

(56) References Cited

U.S. PATENT DOCUMENTS 5,441,670 A    8/1995  Shimamune et al.
5,698,483 A   12/1997  Ong et al.
(Continued)

FOREIGN PATENT DOCUMENTS

CN         1967918 A      5/2007
CN       101036200 A      9/2007
(Continued)

OTHER PUBLICATIONS

Manseau et al "Preparation and characterization of Nb-doped TiO2-gamma nanoparticles . . . ", 207th ECS Meeting, Abstract 1617, 2005.*
(Continued)

*Primary Examiner* — Mark Kopec
(74) *Attorney, Agent, or Firm* — Hodgson Russ LLP

(57) ABSTRACT

Conducting metal oxide and nitride nanoparticles that can be used in fuel cell applications. The metal oxide nanoparticles are comprised of for example, titanium, niobium, tantalum, tungsten and combinations thereof. The metal nitride nanoparticles are comprised of, for example, titanium, niobium, tantalum, tungsten, zirconium, and combinations thereof. The nanoparticles can be sintered to provide conducting porous agglomerates of the nanoparticles which can be used as a catalyst support in fuel cell applications. Further, platinum nanoparticles, for example, can be deposited on the agglomerates to provide a material that can be used as both an anode and a cathode catalyst support in a fuel cell.

18 Claims, 5 Drawing Sheets

(51) Int. Cl.

| | | |
|---|---|---|
| H01L 31/00 | (2006.01) | |
| C01G 23/04 | (2006.01) | |
| C01G 23/047 | (2006.01) | |
| B82Y 30/00 | (2011.01) | |
| C01G 25/02 | (2006.01) | |
| C01G 33/00 | (2006.01) | |
| C01G 35/00 | (2006.01) | |
| C01G 41/02 | (2006.01) | |
| H01M 4/86 | (2006.01) | |
| H01M 4/90 | (2006.01) | |
| H01M 8/1018 | (2016.01) | |

(52) U.S. Cl.
CPC ............ *C01G 35/00* (2013.01); *C01G 41/02* (2013.01); *H01B 1/06* (2013.01); *H01B 1/08* (2013.01); *H01M 4/8605* (2013.01); *H01M 4/90* (2013.01); *H01M 4/9016* (2013.01); *C01P 2002/52* (2013.01); *C01P 2002/72* (2013.01); *C01P 2004/03* (2013.01); *C01P 2004/61* (2013.01); *C01P 2004/62* (2013.01); *C01P 2004/64* (2013.01); *C01P 2006/12* (2013.01); *C01P 2006/14* (2013.01); *C01P 2006/40* (2013.01); *H01M 2008/1095* (2013.01)

(56) References Cited

U.S. PATENT DOCUMENTS

| | | |
|---|---|---|
| 5,846,505 A | 12/1998 | Saegusa |
| 6,524,750 B1 | 2/2003 | Mansuetto |
| 6,932,848 B2 | 8/2005 | Dardas et al. |
| 7,704,918 B2 | 4/2010 | Adzic et al. |
| 2003/0181321 A1 | 9/2003 | Hampden-Smith et al. |
| 2004/0038808 A1 | 2/2004 | Hampden-Smith et al. |
| 2004/0171480 A1 | 9/2004 | Hampden-Smith et al. |
| 2006/0025301 A1 | 2/2006 | Reddy et al. |
| 2006/0172886 A1 | 8/2006 | Shimazu et al. |
| 2006/0233691 A1 | 10/2006 | Vanderspurt et al. |
| 2006/0251954 A1 | 11/2006 | Merzougui et al. |
| 2006/0254605 A1 | 11/2006 | El-Shall et al. |
| 2006/0263675 A1 | 11/2006 | Adzic et al. |
| 2006/0292062 A1 | 12/2006 | Hojo et al. |
| 2006/0292434 A1 | 12/2006 | Hampden-Smith et al. |
| 2007/0045856 A1 | 3/2007 | Vaartstra et al. |
| 2007/0105228 A1 | 5/2007 | Vanderspurt et al. |
| 2007/0160899 A1 | 7/2007 | Atanassova et al. |
| 2007/0204870 A1 | 9/2007 | Deevi et al. |
| 2007/0264174 A1 | 11/2007 | Willigan et al. |
| 2007/0287025 A1 | 12/2007 | Furubayashi et al. |
| 2007/0292744 A1 | 12/2007 | Lopez et al. |
| 2008/0096093 A1 | 4/2008 | Jang et al. |
| 2008/0292789 A1 | 11/2008 | Sun et al. |
| 2009/0004552 A1 | 1/2009 | Sun et al. |
| 2009/0054230 A1 | 2/2009 | Veeraraghavan et al. |
| 2009/0081528 A1 | 3/2009 | Nakano et al. |
| 2009/0202869 A1 | 8/2009 | Sawaki et al. |
| 2009/0221418 A1 | 9/2009 | Fischer et al. |
| 2009/0312181 A1 | 12/2009 | Do et al. |
| 2010/0008840 A1 | 1/2010 | Zhong et al. |

FOREIGN PATENT DOCUMENTS

| | | |
|---|---|---|
| CN | 101171712 A | 4/2008 |
| WO | 2006119407 | 11/2006 |
| WO | 2006124248 | 11/2006 |
| WO | 2007021695 A2 | 7/2008 |
| WO | 2008084874 | 7/2008 |

OTHER PUBLICATIONS

Hirano et al "New anatase-type Ti1-2xNbxAlxO2 solid solution nanopartciles . . . ", Journal of Nanoscience and Nanotechnology vol. 6, 3820-3827, 2006.*

Biswas et al "Codoped Cr and W rutile nanosized powders . . . ", Ceramics International 34(2008) 1875-1883.*

Fresno et al "Influence of Sn4+ on the structural and electronic properties of Ti1-xSnxO2 nanoparticles and photocatalysts", Phys. Chem. Chem. Phys., 2006, 8, 2421-2430.*

Batzill et al "The surface and materials science of tin oxide", Progress in Surface Scince 79 (2005) 47-154.*

Park, K-W et al. Nb-TiO2 supported Pt cathode catalyst for polymer electrolyte membrane fuel cells, Electrochemistry Communication, Jun. 30, 2007, vol. 9, pp. 2256-2260.

Zhanheng, Y. et al. The phase and thick film oxygen-sensitive response characteristics of oxide (Ti1-xNbx)O2 by prepared by sol-gel method, Journal of Chinese Ceramic Society, Dec. 31, 2006, vol. 31, No. 4, pp. 356-360

Fergus, Jeffrey W., Oxide Anode Materials for Solid Oxide Fuel Cells, Solid State Ionic, vol. 177, 2006, pp. 1529-1541.

Lee et al., Methanol electrooxidation of Pt catalyst on titanium nitride nanostructured support, Applied Catalysis A: General, 375 (2010) 149-155. Jan. 1, 2010.

Chen et al., EIS Studies of Porous Oxygen Electrodes with Discrete Particles, Journal of the Electrochemical Society, 150 (9) E423-E428 (2003). Jul. 15, 2003.

Chhina et al., Transmission Electron Microscope Observation of Pt Deposited on Nb-Doped Titania, Electrochemical and Solid-State Letters, 12 (6) B97-B100 (2009). Apr. 3, 2009.

Elezovic et al., Synthesis, characterization and electrocatalytical behavior of Nb-TiO2/Pt nanocatalyst for oxygen reduction reaction, Journal of Power Sources 195 (2010) pp. 3961-3968. Jan. 28, 2010.

Gojkovic et al., Nb-doped TiO2 as a support of Pt and Pt-Ru anode catalyst for PEMFCs, Journal of Electroanalytical Chemistry 639 (2010), pp. 161-166. Dec. 29, 2009.

* cited by examiner

CONDUCTING METAL OXIDE AND METAL NITRIDE NANOPARTICLES

CROSS-REFERENCE TO RELATED APPLICATIONS

This application claims priority to U.S. provisional patent application No. 61/180,285, filed May 21, 2009, the disclosure of which is incorporated herein by reference.

STATEMENT REGARDING FEDERALLY SPONSORED RESEARCH

This invention was made with government support under contract no. DE-FG02-03ER46072 awarded by the Department of Energy. The government has certain rights in the invention.

FIELD OF THE INVENTION

The present invention generally relates to conducting metal oxides and nitrides, and methods of making the same, which can be used as conducting catalyst supports in fuel cell applications.

BACKGROUND OF THE INVENTION

Fuel Cells were invented about 170 years ago by Sir William Grove. Nonetheless, the promise of generating electricity at high efficiency from the electrochemical reaction of a fuel and oxygen has remained elusive. Widely used technologies, such as combustion of fossil fuels or heat from nuclear reactors, rely on thermal cycles to generate stream to power turbines and connected generators. Because the efficiency of these systems is limited by the second law of thermodynamics to the Carnot limit (max efficiency=$(T_{hot}-T_{cold})/T_{hot}$), current power plants are about 35% efficient, rejecting about 65% of the heat to the environment. This efficiency is limited by the materials available that can reliably withstand $T_{hot}$ and last for many years of operation. Technologists believe that even the most advanced materials possible can only extend the efficiency of thermal power plants to 50% at best. However, while not a common practice, the overall efficiency can be increased by using the waste heat in co-generation systems.

In contrast, fuel cells are the only known method of potentially converting fuels to electricity at nearly 100% efficiency. The free energy of any redox reaction could theoretically be completely converted to electrical energy. In thermal systems, efficiency is determined from the fraction of the enthalpy of the reaction that is converted, as limited by Carnot considerations and inefficiencies in the process. A direct comparison of the efficiencies of the two different systems (thermal and fuel cell) must include the difference between the free energy and the enthalpy: namely T$\Delta$S (T is the absolute temperature and $\Delta$S the change in entropy).

Because of the promise of high efficiency, many potential fuel cell technologies have been explored and are under development. These technologies are characterized by the temperature of operation and also by the fuels that can be used in that technology. One such technology is Polymer Electrolyte Membrane Fuel Cells (PEMFC) that operates at or near room temperature. These fuel cells currently are being developed for possible use in automobiles and for a variety of portable applications. There are still many challenges to be overcome if any of the fuel cell technologies are to be widely deployed, including PEMFCs.

Current PEMFC technology uses carbon black as a catalyst support. The particular blacks used have been optimized to bind 3 to 5 nm platinum catalyst nanoparticles and are conducting enough to transport charge to and from the catalyst. The carbon morphology is also important in supporting open porosity in the electrodes, so that fuel or oxidant can enter and product gasses can escape. Typically, the currently utilized carbon black (e.g., Vulcan XC-72) forms an open interconnected network of 50-100 nm particles.

However, the carbon black catalyst support corrodes too rapidly, especially under transient load and on/off operation conditions. Carbon, in any form, is thermodynamically stable below about 0.2 V, but only kinetically stable above that potential (C+2$H_2$O→$CO_2$+4$H^+$+4$e^-$, E°=0.207 V). However, under fuel starvation in a fuel cell stack, even the anode of a single cell can be forced to a high potential (up to +1.5 V) as oxidation of the carbon is the only process that can support the imposed stack current. In fact, no single metal is thermodynamically stable at such potentials in acidic aqueous media. Gold has the highest reduction potential at 1.5 V vs SHE and will dissolve at lower potentials if the concentration of gold cations in solution is low—as it would be in a PEMFC. Of course, the expense of gold precludes it being used as a catalyst support if fuel cells are to be widely used. Rather, metals either dissolve as cations or less frequently form chemically passivating and electrically insulating oxide coatings. Under alkaline conditions, soluble metal-containing oxo-anions or passivating oxide/hydroxide layers usually result. Since the free energy of formation of intermetallic compounds is usually small compared to that of the respective oxides of the same metals, the result is not much different when intermetallic compounds are exposed to such highly oxidizing conditions. The mechanisms of oxidation will likely be more complex for intermetallics (e.g., leaching and oxidation of the more electropositive element is likely to occur first) but the end result is expected corrosion.

Based on the foregoing there exists and ongoing and unmet need for a conductive catalyst support materials which can be used in fuel cell applications.

BRIEF SUMMARY OF THE INVENTION

The present invention provides conducting metal oxide and/or nitride nanoparticles. These nanoparticles can be used in applications such as, for example, fuel cells. Materials prepared from the conducting nanoparticles can be used, for example, as catalyst supports in fuel cell applications.

In one aspect, the present invention provides conducting metal oxide and/or metal nitride nanoparticles. In one embodiment, the conducting metal oxide nanoparticles include a metal or metals selected from titanium, niobium, tantalum, tungsten and combinations thereof. In one embodiment, the metal nitride nanoparticles include a metal or metals selected from titanium, niobium, tantalum, tungsten, zirconium, and combinations thereof. The nanoparticles have a conductivity of at least 0.1 S/cm. The metal oxide nanoparticles have a metal or metals that each have at least one valence electron available for conduction. In one embodiment, preparation of the conducting nanoparticles utilizes a step that reduces at least one of the metals in the nanoparticles such that the metal has at least one electron available for conduction that is not involved in bonding. For example, a preparation of W-doped titanium oxide nanoparticles of the present invention utilizes a step that reduces the W from W(VI) to W(IV).

In one embodiment, the conducting metal oxide nanoparticles additionally include a metal or metals selected from vanadium, molybdenum, ruthenium, tin, iron, chromium, manganese, nickel, cobalt and combinations thereof. In one embodiment, the conducting metal oxide and/or nitride nanoparticles have a rutile structure.

In various embodiments, the metal oxide nanoparticles comprise a composition represented as $Ti_{1-x}M_xO_2$, where M is a metal selected from tungsten, vanadium, niobium, tantalum, a tin and ruthenium and x is from 0.001 to 0.6, $Ti_{1-x-y}M_xM'_yO_2$, where M and M' are metals selected from tungsten, vanadium, niobium, tantalum, tin and ruthenium and x is from 0.01 to 0.5 and y is 0.01 to 0.5, and $Ti_{1-x-y}M_xA'_yO_2$, where A' is a metal selected from chromium, manganese, iron, cobalt, and nickel and if A' is chromium x is greater than or equal to y and x+y is less than 0.4 and if A' is manganese, iron, cobalt, or nickel x is greater than or equal to 2y and x+y is less than 0.4.

In various embodiments, the metal nitrides nanoparticles comprise a composition represented as $Ti_{1-x}Mo_xN$, $Ti_{1-x}W_xN$ or $Nb_{1-x}W_xN$, where x is from 0.01 to 0.50.

The metal oxide nanoparticles are conducting. It is desirable that the nanoparticles have a conductivity of at least 0.1 S/cm. Without intending to be bound by any particular theory, it is considered that conductivity can result from the presence of a metal or metals in the oxide with excess valence electrons (e.g., presence of $W^{+4}$ has two remaining valence electrons, in a $5d^2$ configuration) which are not required for bonding and are available for conduction.

In one aspect, the present invention provides a porous conducting metal oxide and/or metal nitride material for use as a catalyst support in a fuel cell. In one embodiment, the porous conducting metal oxide and/or metal nitride material is used as a catalyst support in a fuel cell operating under acidic conditions (e.g., a pH of 6 or less and typically, from 1 to 2). In another embodiment, the porous conducting metal oxide and/or metal nitride material is used as a catalyst support or as both a combined catalyst support and catalyst in a fuel cell operating under alkaline conditions (e.g., a pH of 8 or greater and typically 13 to 14). The porous conducting material is comprised of the metal oxide and/or metal nitride nanoparticles agglomerated to form a material that is a network of interconnected nanoparticles that support an open, interconnected network of pores. In one embodiment, the present invention provides a fuel cell comprising the porous conducting material of the present invention used as an catalyst support material.

In one aspect, the present invention provides a method for producing late-transition metal (late-transition metals with an oxidation state of 3+ or less, e.g., $Cr^{3+}$ or $Ni^{2+}$) doped titanium/tungsten oxide.

DETAILED DESCRIPTION OF THE INVENTION

Figure 1:
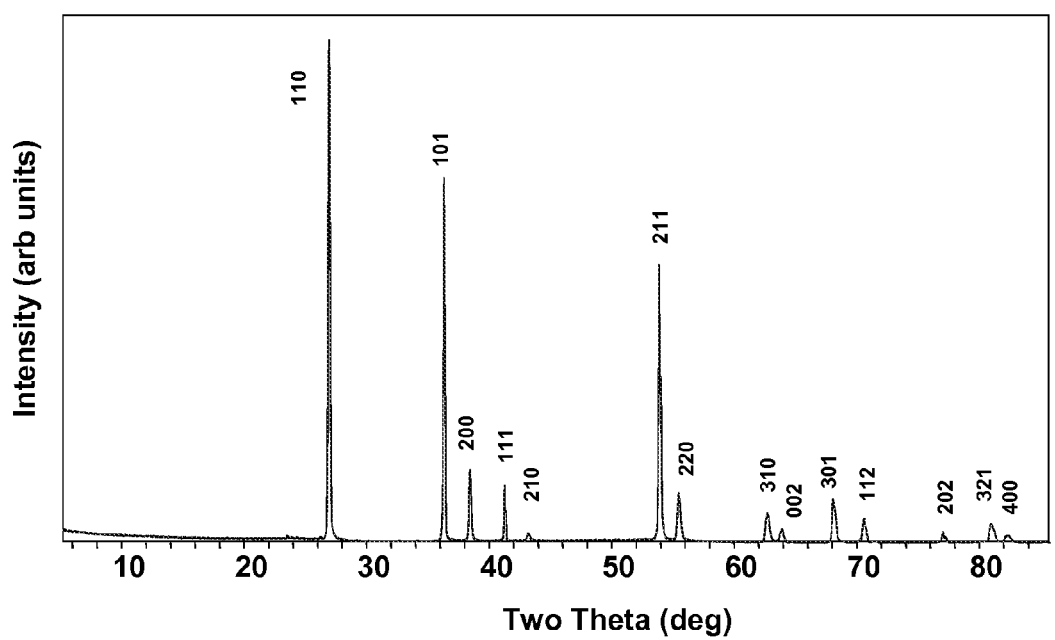
FIG. 1. X-ray diffraction pattern of $Ti_{0.7}W_{0.3}O_2$ produced by the high temperature (1100° C.) method described in the text. The peaks are indexed to a tetragonal unit cell, but are shifted slightly from that of rutile (PDF #001-072-4812) due to the substitution of W for Ti.

The present invention provides conducting metal oxide and/or nitride nanoparticles. These nanoparticles can be used in applications such as, for example, fuel cells. Materials prepared from the conducting nanoparticles can be used, for example, as catalyst supports in fuel cell applications. Specifically, materials prepared using the conducting nanoparticles can be used as electrode (e.g., anode and cathode) catalyst supports in a fuel cell.

The present invention provides, in several embodiments, the preparation of conducting W-doped $TiO_2$ (rutile phase: $Ti_{(1-x)}W_xO_2$) and preparation and use of 50 nm nanoparticles of this composition for catalyst supports. In other embodiments, the present invention provides $Nb_2O_5$, $Ta_2O_5$ and $WO_3$ as doping hosts for catalyst supports. These oxides are more difficult to dope to the metallic state while keeping the host structure (at least at high temperatures).

In one embodiment, preparation of the conducting nanoparticles utilizes a step that reduces at least one of the metals in the nanoparticles such that the metal has at least one electron not involved in bonding. For example, a preparation of W-doped titanium oxide nanoparticles of the present invention utilizes a step that reduces the W from W(VI) to W(IV). Materials of the present invention were tested for stability in various acids and bases. For example, $Ti_{0.3}W_{0.7}O_2$ was not very stable in acids with complexing anions such as $H_2SO_4$ or $HNO_3$; however, it was stable in solutions containing Nafion®, the ionomer used as electrolyte membrane in PEMFCs. The stability of the doped oxide materials of the present invention varies with the identity and concentrations of the dopant. For example, the acid-stability of the conducting Ti—W oxide was significantly improved upon Nb doping.

In one aspect, the present invention provides conducting metal oxide and/or metal nitride nanoparticles. In one embodiment, conducting metal oxide nanoparticles are comprised of a metal selected from, for example, titanium, tungsten, niobium, tantalum and combinations thereof, and oxygen. In another embodiment, the conducting metal oxide nanoparticles comprise elements from Groups IV, V and VI of the Periodic Table and oxygen. In one embodiment, the conducting metal oxide nanoparticles further comprise a metal selected from vanadium, zirconium, hafnium, molybdenum, ruthenium, tin, iron, chromium, manganese, nickel, cobalt and combinations thereof.

The metal oxide nanoparticles are conducting. It is desirable that the nanoparticles have a conductivity of at least 0.1 S/cm. In various embodiments the metal oxide nanoparticles have a conductivity of at least 0.2, 0.3, 0.4, 0.5, 0.6, 0.7, 0.8, 0.9, 1, 5, 10, 15, 20, 25, 50, 100 and 200 S/cm. Without intending to be bound by any particular theory, it is considered that conductivity can result from the presence of a metal or metals in the oxide with excess valence electrons (e.g., presence of $W^{+4}$ has two remaining valence electrons, in a $5d^2$ configuration) which are not required for bonding and are available for conduction. The conductivity of the nanoparticles can be measured by pressing a sample of the nanoparticles between two stainless steel pistons and gradually applying increasing pressure until the applied is between 1 and 1000 psi. Measured resistance values were used to determine the conductivity of the sample. The conductivity of the nanoparticles depends on the pressure that is applied to the nanoparticles, but at modest pressures of 1 to 100 psi, it can be 0.1 S/cm or greater depending upon composition.

In one embodiment, the conducting nanoparticles have a composition represented as $Ti_{1-x}M_xO_2$, where the value of x can be from 0.001 to 0.6, including all values and ranges to the 0.001 therebetween. For example, M is W, V, Nb, Ta, Sn or Ru. The nanoparticles can exhibit a Rutile-type structure. A specific example of such a metal oxide is $Ti_{0.7}W_{0.3}O_2$. Examples of a $Ti_{1-x}M_xO_2$ composition include, but are not limited to, $Ti_{0.9}W_{0.1}O_2$, $Ti_{0.8}W_{0.2}O_2$, $Ti_{0.7}W_{0.3}O_2$, $Ti_{0.7}V_{0.3}O_2$, $Ti_{0.6}V_{0.4}O_2$, $Ti_{0.5}V_{0.5}O_2$, $Ti_{0.9}Nb_{0.1}O_2$, $Ti_{0.8}Nb_{0.2}O_2$, $Ti_{0.7}Nb_{0.3}O_2$, $Ti_{0.95}Nb_{0.05}O_2$, $Ti_{0.6}Nb_{0.4}O_2$, $Ti_{0.5}Nb_{0.5}O_2$, $Ti_{0.7}Ta_{0.3}O_2$, $Ti_{0.6}Ta_{0.4}O_2$, $Ti_{0.5}Ta_{0.5}O_2$, $Ti_{0.95}Ta_{0.05}O_2$, $Ti_{0.9}Ta_{0.1}O_2$, $Ti_{0.85}Sn_{0.15}O_2$, $Ti_{0.7}Sn_{0.3}O_2$, $Ti_{0.7}Ru_{0.3}O_2$, $Ti_{0.8}Ru_{0.2}O_2$, $Ti_{0.9}Ru_{0.1}O_2$. Other examples include, but are not limited to, $Ti_{1-x}Zr_xO_2$ and $Ti_{1-x}Hf_xO_2$, however these are non-conducting since the dopant metals are in their highest oxidation state.

In another embodiment, the nanoparticles have a composition represented as $Ti_{1-x-y}M_xM'_yO_2$. The values of x and y can be, independently, from 0.05 to 0.5, including all values and ranges to the 0.01 therebetween, such that x+y is less than or equal to 0.6. For example, M is W and M' is Nb, Ta or V. Specific examples of a $Ti_{1-x-y}M_xM'_yO_2$ composition include, but are not limited to, $Ti_{0.7}W_{0.1}Nb_{0.2}O_2$, $Ti_{0.7}W_{0.15}Nb_{0.15}O_2$, $Ti_{0.7}W_{0.2}Nb_{0.1}O_2$, $Ti_{0.7}W_{0.25}Nb_{0.05}O_2$, $Ti_{0.6}W_{0.3}Nb_{0.1}O_2$, $Ti_{0.6}W_{0.2}Nb_{0.2}O_2$, $Ti_{0.6}W_{0.1}Nb_{0.3}O_2$, $Ti_{0.55}W_{0.3}Nb_{0.15}O_2$, $Ti_{0.55}W_{0.25}Nb_{0.2}O_2$, $Ti_{0.55}W_{0.2}Nb_{0.25}O_2$, $Ti_{0.55}W_{0.15}Nb_{0.3}O_2$, $Ti_{0.7}W_{0.15}Ta_{0.15}O_2$, $Ti_{0.7}W_{0.2}Ta_{0.1}O_2$, $Ti_{0.7}W_{0.1}Ta_{0.2}O_2$, $Ti_{0.7}W_{0.25}Ta_{0.05}O_2$ and $Ti_{0.7}W_{0.2}V_{0.1}O_2$.

In yet another embodiment, the nanoparticles have a composition represented as $Ti_{1-x-y}M_xA'_yO_2$. Examples of a $Ti_{1-x-y}M_xA'_yO_2$ include, but are not limited to, $Ti_{1-x-y}W_xCr_yO_2$ for x≥y up to x+y=0.4, $Ti_{1-x-y}W_xMn_yO_2$ for x≥2y up to x+y=0.4, $Ti_{1-x-y}W_xFe_yO_2$ for x≥2y up to x+y=0.4, $Ti_{1-x-y}W_xCo_yO_2$ for x≥2y up to x+y=0.4, $Ti_{1-x-y}W_xNi_yO_2$ for x≥2y up to x+y=0.4. For example, M is W and A' is Cr, Mn, Fe, Co, or Ni. Other examples include, $Ti_{0.7}W_{0.15}Cr_{0.15}O_2$, $Ti_{0.7}W_{0.2}Mn_{0.1}O_2$, $Ti_{0.7}W_{0.15}Fe_{0.15}O_2$, $Ti_{0.7}W_{0.2}Fe_{0.1}O_2$, $Ti_{0.7}W_{0.2}Co_{0.1}O_2$ and $Ti_{0.7}W_{0.2}Ni_{0.1}O_2$. It was surprisingly observed that nanoparticles with a $Ti_{1-x-y}M_xA'_yO_2$ composition, where A' is Cu, Ag, Au, Zn, Pt, Cd and Hg and x is greater than zero, could not be prepared by the method disclosed herein.

In still another embodiment, mixed oxides from Groups IV, V, and VI of the Periodic Table can be used as a host for doping. For example, the conducting nanoparticles have $Nb_2O_5 \cdot TiO_2$ as a host and are doped with $W^{+4}$ to produce a conducting single phase material (which have a structure other than rutile) with a $Nb_{10}Ti_2O_{29}$ structure.

In another aspect, the invention provides conducting metal nitride nanoparticles. In one embodiment, the conducting metal nitride comprises a metal or metals selected from titanium, niobium, tantalum, tungsten, zirconium, and combinations thereof. In one embodiment, the metal nitride nanoparticles are comprised of a metal or metals selected from Groups IV, V and VI of the Periodic Table. Metal nitride nanoparticles are desirable as they typically have greater conductivity than oxide nanoparticles of similar composition. It is expected that metal nitride nanoparticles can exhibit a conductivity of 10 S/cm or greater. It is desirable that the metal nitride nanoparticles have a conductivity of at least 0.1 S/cm. In various embodiments the metal nitride nanoparticles have a conductivity of at least 0.2, 0.3, 0.4, 0.5, 0.6, 0.7, 0.8, 0.9, 1, 5, 10, 15, 20, 25, 50, 100, 200, 300, 500, 1000, 2000 S/cm. The nitride nanoparticles can have a thin native oxide layer on the surface of the nanoparticle. However, this oxide layer is not expected to have a significant effect on the conductivity of the nanoparticles or materials made from the nanoparticles.

Examples of metal nitride nanoparticles include, but are not limited to, TiN, NbN, TaN and ZrN and the like. In various embodiments, the metal nitride nanoparticles have a composition represented by the following $Ti_{1-x}Mo_xN$ and $Nb_{1-x}W_xN$. The value of x can be from 0.01 to 0.50.

An example of a method to prepare the nitrides is by reaction of the metal oxide nanoparticles with ammonia gas at temperatures of from 500 to 1200° C. It is desirable to conduct this reaction at a low temperature such that the particle size and/or morphology of the nanoparticles is maintained. Other methods include, for example, reaction of metals directly with nitrogen at temperatures above 1200° C.

A nanoparticle form of the nitride can be prepared, for example, by reacting the nanoparticle form of the corresponding oxide. The corresponding metal oxide nanoparticles are prepared, for example, by the methods described herein. Typically, the reactant oxide is put in an alumina or silica boat and inserted into a silica tube, and ammonia gas is then flowed through the tube and over the oxide. At the processing temperature the oxide reacts with the ammonia to form the desired nitride.

Compositions of the present invention can be prepared by a high-temperature method such as, for example, in Example 1, which uses a chemical transport agent (e.g., hexachlorobenzene). Typically, the high-temperature method provides particles in the micron range. For use as catalyst supports, larger particles can be ground into particles having the desired nanometer-size range. However, the resulting particles lack an open porous network necessary for catalyst support applications. Conducting nanoparticles can be prepared by a sol-gel process based on established sol-gel processes. For example, sol-gel precursors of the desired metal or metals can be combined with citric acid in a suitable solvent or solvents (e.g., ethanol). After heating this mixture at modest temperature (e.g., about 75° C. for several hours) to drive off the majority of the solvent, the reaction mass is calcined (e.g., heated at 450° C. in air for up to 12 hours) to burn off all organic materials in the product. Finally, the desired conducting doped metal oxide materials are obtained by heating the calcined product with Zr foil to about 750° C. in an oxygen-free environment and reducing the dopant metal to induce conductivity.

The nanoparticles of the present invention are conducting. In one embodiment, non-conducting nanoparticles are prepared and reacted with Zr, which acts as an oxygen scavenger, to provide conducting. For example, non-conducting nanoparticles can be reacted with Zr foil at a temperature of 700-800° C. in sealed tube (oxygen-free environment). The resulting nanoparticles (and materials comprising these nanoparticles) exhibit conductivity such that they can be used as catalyst supports for fuel cell applications.

The nanoparticles can be crystalline. For example, the doped-$TiO_2$ conducting nanoparticles have a rutile-type structure (e.g., the XRD patterns of the nanoparticles can be indexed to a tetragonal unit cell, but the lattice parameters of the doped oxide are slightly shifted from those of pure rutile). As another example, W-doped titanium dioxide has a rutile structure at W doping levels up to and including 50% and a distorted rutile structure is expected at doping levels of greater than 50%. As yet another example, the nitride nanoparticles can have a rutile-type structure. The nanoparticles can have a spherical or non-spherical morphology. The length of the longest axis of the nanoparticles can be from 5 nm to 2 microns, including all values to the 1 nm there between. More specifically the length is from 10 to 100 nm.

In one aspect, the present invention provides a porous conducting metal oxide and/or metal nitride material for use as a catalyst support in a fuel cell. In one embodiment, the porous conducting metal oxide and/or metal nitride material is used as a catalyst support in a fuel cell operating under acidic conditions (e.g., a pH of 6 or less and typically, from 1 to 2). The porous conducting material is comprised of the metal oxide and/or metal nitride nanoparticles agglomerated to form a material that is a network of interconnected nanoparticles that support an open, interconnected network of pores. Without intending to be bound by any particular theory, it is considered that the porous material is conducting based on the conductivity of the nanoparticles and interconnection of the nanoparticles in the agglomerates resulting from surface to surface contact of the nanoparticles.

The porous conducting material can be prepared, for example, by sol-gel based methods (such as those described herein), or templating methods using polymers (e.g., block co-polymers). It is desirable that the material not be further oxidized under typical fuel cell conditions such as operating temperatures of up to about 150° C., a potential of up to 1.5 V (vs. SHE) (the maximum potential of use is approximately 1.5 V-0.060 V times the pH value), and pH of as low as 0. The porous conducting material is a free-flowing powder and can be described as an agglomeration of the nanoparticles. The agglomerates can be from 1 to 10 microns in size (as determined by the longest axis of the agglomerates). The material has an open porous morphology. The pores can range in size form 50 to 100 nm (as determined by the longest axis of the pore opening), including all integers and ranges therebetween. The porosity is from 10 to 90%, including all integers and ranges therebetween. In various embodiments, the porosity is at least 50%, from 50% to 90% or from 65% to 85%. For example, porosity of the material can be measured by comparing the theoretical volume of the material to the volume of the material when well-packed without applying any pressure or by BET measurements. A level of porosity which provides the required mass transfer and conductivity is desirable. A porosity of near 75% is desirable.

It is desirable that the porous conducting material has a conductivity of at least 0.1 S/cm. In various embodiments the metal oxide nanoparticle based material has a conductivity of at least 0.2, 0.3, 0.4, 0.5, 0.6, 0.7, 0.8, 0.9, 1, 5, 10, 15, 20, 25, 50, 100 and 200 S/cm. In various embodiments the metal nitride nanoparticle based material has a conductivity of at least 0.2, 0.3, 0.4, 0.5, 0.6, 0.7, 0.8, 0.9, 1, 5, 10, 15, 20, 25, 50, 100, 200, 300, 500, 1000, 2000 S/cm. The conductivity of the material can be measured by pressing a sample of the material between two stainless steel pistons and gradually applying increasing pressure until the applied pressure is between 1 and 1000 psi. Measured resistance values were used to determine the conductivity of the sample. The conductivity of the materials depends on the pressure that is applied to the sample, but at modest pressures of 1 to 100 psi, it can be 0.1 S/cm or greater depending upon composition.

In another embodiment, the porous conducting metal oxide and/or metal nitride material is used as a catalyst support or as both a combined catalyst support and catalyst in a fuel cell operating under alkaline conditions (e.g., a pH of 8 or greater and typically 13 to 14). The porous conducting material is comprised of the metal oxide (or metal nitride) nanoparticles agglomerated to form a material that is a network of interconnected nanoparticles that support an open, interconnected network of pores. Without intending to be bound by any particular theory, it is considered that the porous material is conducting based on the conductivity of the nanoparticles and interconnection of the nanoparticles in the agglomerates resulting from surface to surface contact of the nanoparticles.

The material can be prepared, for example, by sol-gel based methods (such as those described herein), or templating methods using polymers (e.g., block co-polymers). It is desirable that the material is not oxidized under typical fuel cell conditions such as operating temperatures of up to about 150° C., a potential of up to 1.5 V (vs. SHE) (the maximum potential of use is approximately 1.5 V-0.060 V times the pH value), and pH of as high as 14. Optionally, the nanoparticles comprise late-transition metals such as, for example, Fe, Co and Ni—which cannot be doped into pure $TiO_2$, but can, for example, be doped into tungsten-doped $TiO_2$, e.g., $Ti_{1-x}W_xO_2$. The porous material is both conducting and catalytic (in the case of the late-transition metal doped materials). The synergy between the catalyst support and catalyst is well demonstrated by the improved CO-tolerance of $Pt/Ti_{0.7}W_{0.3}O_2$. $Pt/Ti_{0.7}W_{0.3}O_2$ exhibits high activity for $H_2$ oxidation as well as a higher CO tolerance than currently used Pt/C and PtRu/C catalysts. $Pt/Ti_{0.7}W_{0.3}O_2$ can be used as an anode catalyst for fuel cell (e.g., PEMFC) applications.

The porous conducting material is a free-flowing powder and can be described as an agglomeration of the nanoparticles. The agglomerates can be from 1 to 10 microns in size (as determined by the longest axis of the agglomerates), including all integers and ranges between 1 and 10 microns. The material has an open porous morphology. The pores can range in size form 50 to 100 nm (as determined by the longest axis of the pore opening), including all integers and ranges therebetween. The porosity is from 10 to 90%, including all integers and ranges therebetween. In various embodiments, the porosity is at least 50%, from 50% to 90% or from 65% to 85%. For example, porosity of the material can be measured by comparing the theoretical volume of the material to the volume of the material when well-packed without applying any pressure, or by BET measurements. A level of porosity which provides the required mass transfer and conductivity is desirable. A porosity of near 75% is desirable.

It is desirable that the porous conducting material has a conductivity of at least 0.1 S/cm. In various embodiments the metal oxide nanoparticle based material has a conductivity of at least 0.2, 0.3, 0.4, 0.5, 0.6, 0.7, 0.8, 0.9, 1, 5, 10, 15, 20, 25, 50, 100 and 200 S/cm. In various embodiments the metal nitride nanoparticle based material has a conductivity of at least 0.2, 0.3, 0.4, 0.5, 0.6, 0.7, 0.8, 0.9, 1, 5, 10, 15, 20, 25, 50, 100, 200, 300, 500, 1000, 2000 S/cm. The conductivity of the material can be measured by the methods described herein. The conductivity of the nanoparticles or materials depends on the pressure that is applied to the particles, but at modest pressures of 1 to 100 psi, it can be 0.1 S/cm or greater depending upon composition.

In one aspect, the porous conducting metal oxide and/or metal nitride material has a catalyst (e.g., platinum) deposited on the surface of material. For example, reduction (e.g., by reaction of sodium borohydride or hydrazine) of a platinum compound (e.g., $H_2PtCl_6$ in methanol and an aqueous solution of $Pt(NH_3)_2(NO_2)_2$) in the presence of the nanoparticles can be used to deposit a catalyst on the surface of the conducting nanoparticles. It is desirable that the platinum deposited on the surface uniformly as nanoparticles and that the nanoparticles adhere to the material. Typically, the nanoparticles have a size of about 3 nm to about 6 nm. Other examples of platinum deposition include impregnation-reduction of $H_2PtCl_6$ using $H_2/N_2$ (which is desirable for, for example, $Ti_{0.7}W_{0.3}O_2$) and an ethylene glycol-urea method (which is desirable when Nb is used as a dopant).

In one aspect, the present invention provides a fuel cell comprising the porous conducting material of the present invention. In one embodiment, the material further comprises platinum. For example, the platinum is disposed on the surface of the material. The conducting material is used, for example, as a cathode and/or conducting support material in a fuel cell operating at a pH of less than 6 or greater than 8.

In one embodiment, a PEMFC comprises a polymer electrolyte membrane, a catalyst support comprising a porous conducting material of the present invention, a catalyst (e.g., platinum or platinum alloy), disposed between a cathode and an anode made of porous-carbon cloth. In this embodiment, the catalyst support comprising a porous conducting material of the present invention and the catalyst (e.g., platinum or platinum alloy) can be replaced by a porous material of the present invention that both conducting and catalytic as described herein.

In one aspect, the present invention provides a method for producing late-transition metal (late-transition metals with an oxidation state of 3+ or less, e.g., $Cr^{3+}$ or $Ni^{2+}$) doped titanium/tungsten oxide. In one embodiment, the method for making doped titanium tungsten oxide comprising late-transition metals having an oxidation state of +3 or less comprises the steps of: (a.) providing a titanium tungsten oxide; and (b) contacting the titanium tungsten oxide with a late-transition metal or late transition metal oxide, where the late transition metal has an oxidation state of +3 or less, such that a doped-titanium tungsten oxide is formed. The dopant can be a late transition metal such as, for example, $Ni^{3+}$, $Co^{2+}$ or $Cr^{3+}$. Typically, it is not possible to prepare $TiO_2$ doped with transition metals in an oxidation state of 3+ or less. It was a surprising result that tungsten-doped $TiO_2$, e.g., $Ti_{1-x}W_xO_2$ where the value of x can be from 0.01 to 0.50, can be doped with late-transition metals such as, for example, $Cr^{3+}$ or $Ni^{2+}$. Examples include $Ti_{0.7}W_{0.15}Cr_{0.15}O_2$ and $Ti_{0.7}W_{0.20}Ni_{0.1}O_2$. The maximum content of such substitution occurs when the W is oxidized to 5+.

The following examples are presented to illustrate the present invention. They are not intended to limiting in any manner.

EXAMPLE 1

Preparation and Characterization of Conducting Ti/W Oxides in Bulk and Nanoparticle Form Synthesis:

While a nearly single phase bulk powder of $Ti_{1-x}W_xO_2$ has been prepared by hot pressing stoichiometric reactants under an argon atmosphere in a graphite furnace at 1400-1500° C., we have found a lower temperature method to be more convenient. Sealing the appropriate ratio of precursors in a silica tube is sufficient to fix the oxygen stoichiometry during a high-temperature synthesis: e.g., at 1100° C. with a halide transport agent such as chlorine: $(1-x) TiO_2 + 2x/3 (0.5 W + WO_3) \rightarrow Ti_{1-x}W_xO_2$. Typically, 8-10 grams of product can be prepared in a 16 mm ID sealed silica tube (about 20 cm in length) containing only about 10 mg of hexachlorobenzene. The hexachlorobenzene decomposes at elevated temperatures to release chlorine, which is a suitable chemical transport agent under these conditions. The powder produced by this method is largely agglomerates of small single crystals with dimensions between 1 and 20 microns. We have determined that the maximum doping ($x_{max}$) that retains the single phase rutile structure is greater than 50% for W.

Titanium tetra-isopropoxide (0.52 mL) and ethylene glycol (0.14 mL) were added to 10 mL ethanol each, while tungsten hexa-ethoxide (0.34 g) and citric acid (0.96 g) were dissolved in 45 and 15 mL of anhydrous ethanol, respectively. The solutions were then mixed together on a Schlenk-line under air-free conditions, resulting in a 2:1:1 citric acid to metal to ethylene glycol molar ratio solution. The mixture was then exposed to air, poured into a Petri Dish and heated in air to evaporate the solvent and polymerize the citric acid and ethylene glycol at 75° C. for up to 12 hours in a drying oven. The resulting clear gel was then calcined at 450° C. in air for 6 hours. The calcined product is a free flowing, white to light tan powder. At this point, the W is fully oxidized (6+) and needs to be reduced (4+). This was achieved by heating the calcined sample in a sealed, evacuated silica tube with stoichiometric amounts of Zr foil at 750° C. for up to 2 days. The Zr metal is kept separate from the oxide by putting it in a small open silica tube. The Zr forms $ZrO_2$ on heating, thereby reducing the W from 6+ to 4+. $Ti_{0.7}W_{0.3}O_2$ is a black, free-flowing powder. A TGA scan of the calcined product was conducted prior to heating with Zr to quantify the water adsorbed on the relatively high surface area of the cool, air-exposed calcined material (generally close to 3.5 wt %) and to precisely determine the exact amount of Zr foil required to reduce the $W^{6+}$ just to $W^{4+}$. All of the $H_2O$ was carefully removed from the calcined material before sealing the tube by pumping under vacuum and gently heating until no increase in vacuum pressure was seen with further heating. The presence of $H_2O$ not only would preclude the proper reduction of W, it also acts as a good W-transport agent at elevated temperatures and results in an inhomogeneous final product. The particle size is determined by the time and temperature of heating, while particle morphology and connectivity can be changed by varying the solvents and coordinating ligands.

Platinization of the nanoscale powders using hydrazine was done according to the following procedure. About 1 g of $Ti_{0.7}W_{0.3}O_2$ was sonicated in 300 mL $H_2O$, heated to 80° C., and mixed with a solution of 1.6 g $(NH_3)_2Pt(NO_2)_2$ in 100 mL $H_2O$. This mixture was heated to 80° C. with CO bubbling at 400 sccm for up to 30 minutes with constant stirring. The pH of the solution was adjusted to 3 using acetic acid, and a solution of hydrazine (0.333 g in 10 mL $H_2O$) was added. The mixture was stirred with CO bubbling at 80° C. for up to 3 hours, and then stirring was continued overnight at room temperature. The final product was obtained by filtration and vacuum drying.

Characterization:

FIG. 1 shows a powder X-ray diffraction pattern of a sample at x=0.30 that was heated for 10 days under the above conditions. The pattern can be completely indexed with a tetragonal unit cell: a=4.682(1) Å, c=2.903(1) Å, vol.=63.66 Å$^3$. The lattice parameters of pure $TiO_2$ are: a=4.593 Å, c=2.956 Å, with Z=2 and vol.=62.42 Å$^3$. Pure $WO_2$ has a distorted rutile structure (monoclinic) that shows pronounced W-W pair formation with a volume of 65.43 Å$^3$ for two formula units. The lattice parameters vary linearly with x: the a-axis expands while the c-axis contracts due to W-W pair formation that occurs even in the doped $TiO_2$. However, the unit cell volume increases linearly with W content.

Figure 2:
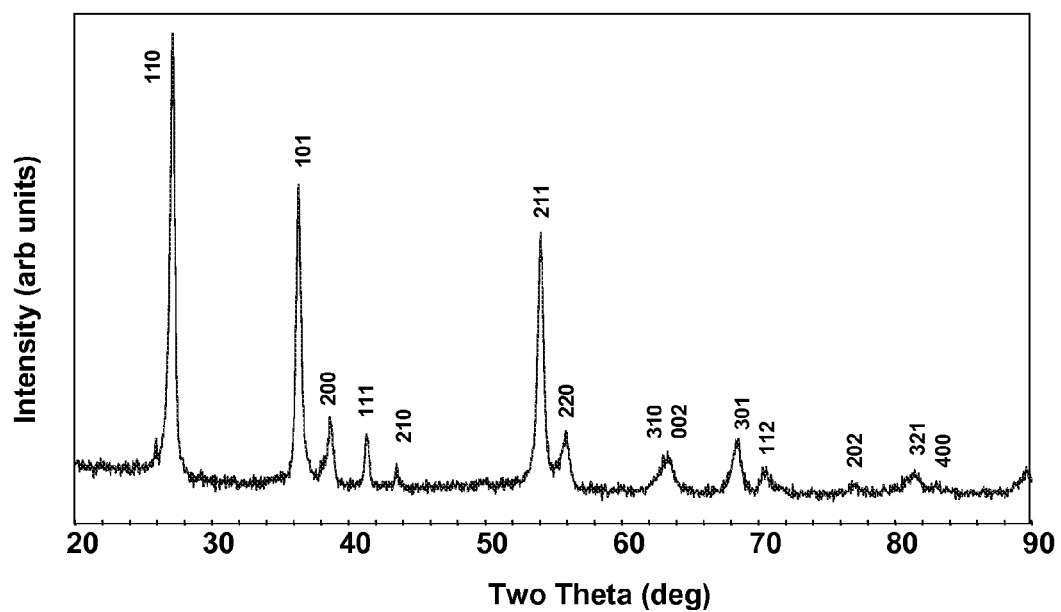
FIG. 2. The X-ray diffraction pattern of $Ti_{0.7}W_{0.3}O_2$ produced by the low temperature citric acid method shows a single phase product. The broad lines indicate small crystallite domain sizes on the order of 20 nm.
Figure 3:
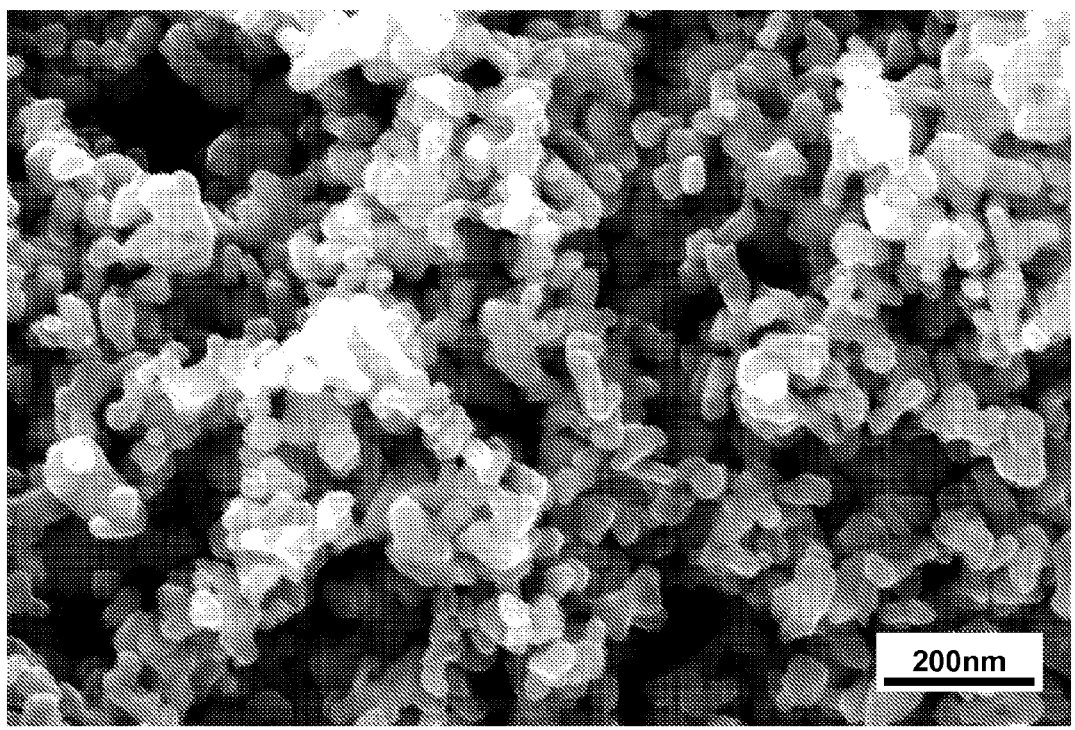
FIG. 3. An SEM image of $Ti_{0.7}W_{0.3}O_2$ prepared using the low temperature citric acid method shows the desired open network of small particles ranging from 20 to 100 nm in size.

The $Ti_{1-x}W_xO_2$ produced by the low temperature citric acid method is also single phase, as determined by X-ray powder diffraction (FIG. 2). The X-ray peaks are broad, due either to the nano-scale size of the oxide crystallite domains or possibly to small compositional inhomogeneity. Assuming uniform composition, the domain size calculated by the Scherer equation for this pattern is 20+/−2 nm. An SEM picture (FIG. 3) of the particles prepared at x=0.3 show the desired particle size and an open network of interconnected particles. The smallest particles visible are consistent with the domain size determined by X-ray diffraction.

An electrical conductivity of approximately 10$^2$ S/cm is observed in pressed powders of $Ti_{1-x}W_xO_2$ prepared by the high temperature method at x=0.3, even though the expected percolation limit for near neighbor W—O—W connectivity is near x=0.5. DFT calculations by Hoffmann et al. predict metallic conductivity due to overlap of occupied W 5d orbitals with neighboring O and Ti.

The stability of the $Ti_{1-x}W_xO_2$ powders produced via high temperature synthesis to oxidation or dissolution is first tested by adding a few ml of 1-2 M nitric acid to a small amount (50-100 mg) of powder in a capped vial. While $TiO_2$ powder does not dissolve as expected from the Pourbaix diagram, purplish black $WO_2$ powder is oxidized in several days to a light green powder of $WO_3$ under the same conditions. The chemical stability of $Ti_{0.7}W_{0.3}O_2$ was tested in considerable stoichiometric excesses of various acids at 80° C. for up to 3-weeks. In $H_2SO_4$ or $HNO_3$, the tungsten was partially leached out and formed tungstite ($WO_3.H_2O$) while the $TiO_2$ formed either titanyl sulfate or titanyl nitrate. SEM images of samples treated both in hydrochloric acid and a mixture of $NaClO_4$ and HCl showed some needles of oxides of tungsten (by microprobe), but there were no noticeable changes in the X-ray patterns of these samples, indicating only slight reaction. Sulfuric and nitric acids are observed to be more aggressive than the other aqueous acids due to the formation of titanyl sulfate and titanyl nitrate complexes, exposing the tungsten to further oxidation forming hydrates of $WO_3$. Interestingly, neither the X-ray pattern nor the SEM images of the sample treated with concentrated Nafion® solution showed any changes. The reaction rate of the acids with the oxide was highest for sulfuric acid, however the reaction was only about 50% complete even after 3 weeks at 80° C. For application as a catalyst support in PEM fuel cells, stability in Nafion® is essential; hence $Ti_{0.7}W_{0.3}O_2$ appears to be a promising candidate based on these results.

Figure 4A:
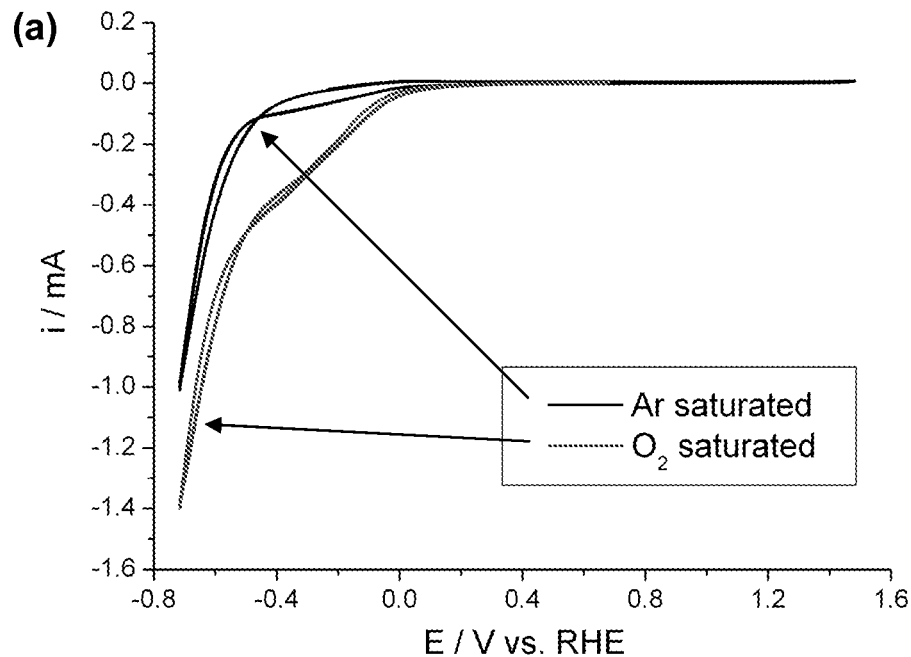
FIG. 4. The electrochemical behavior of $Ti_{0.7}W_{0.3}O_2$ coated glassy carbon electrode in (a) oxygen and argon saturated and (b) hydrogen and argon saturated in 0.1M $H_2SO_4$ (scan rate 10 mV/s, rotating rate 2000 rpm).
Figure 4B:
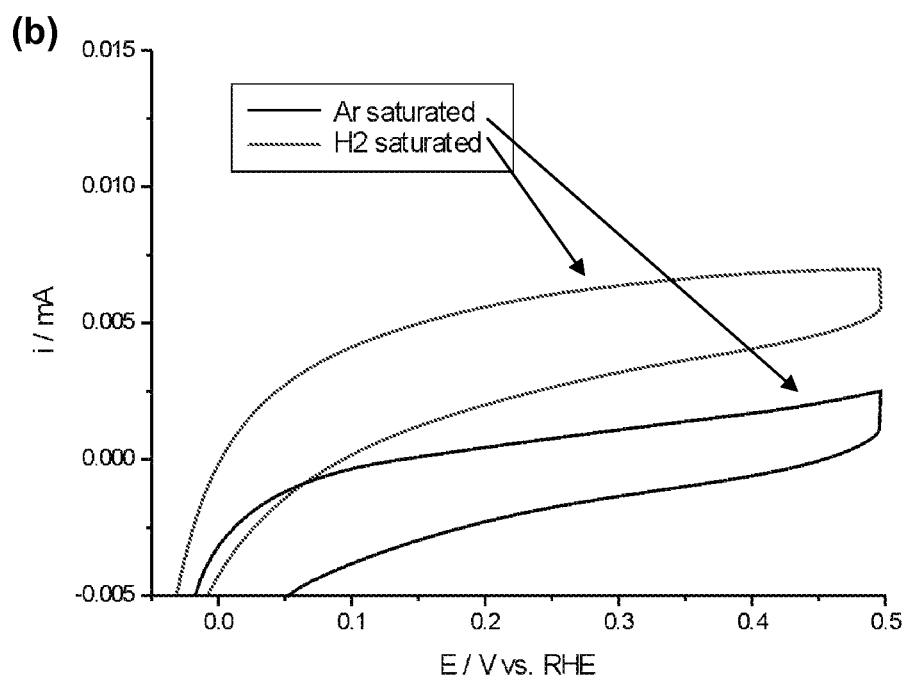

The electrochemical stability of $Ti_{0.7}W_{0.3}O_2$ nanopowders was examined under pH and applied potential conditions comparable to those of a fuel cell. The sample was tested, without any added Pt, over a potential range of 0.0 to 1.2 V vs. RHE in 0.1 M sulfuric acid solution at room temperature. Since both the temperature and acid concentration are much lower than in the above stability tests, and since the electrochemical testing takes no more than a few hours, no evidence of corrosion of the oxide is seen. As shown in FIG. 4, when the sulfuric acid solution is degassed with Argon, the oxide is not electrochemically active in the potential range of fuel cell operation (0 to +1.5 V vs. RHE), suggesting a stable surface. Electrocatalytic activity tests revealed the onset of a low level of oxygen reduction at about −200 mV, and peaks for hydrogen evolution were noticed below −800 mV (FIG. 4a). Generally, a material with activity for hydrogen evolution can also catalyze hydrogen oxidation; hence the sample was tested for activity toward hydrogen oxidation. As seen in FIG. 4b, the sample shows a small activity for hydrogen oxidation. It is important to notice that in both the hydrogen oxidation reaction (HOR) and oxygen reduction reaction (ORR), the CV results are reproducible after multiple cycles, which indicates the electrochemical stability of the $Ti_{0.7}W_{0.3}O_2$ nanopowders. However, the onset potentials for HOR and ORR are much too low to be of interest for application of the material as a fuel cell electrocatalyst rather than as a support. Nevertheless, this data confirms at least short term (meta) stability of $Ti_{0.7}W_{0.3}O_2$ in the potential range of fuel cell operation.

Figure 5A:
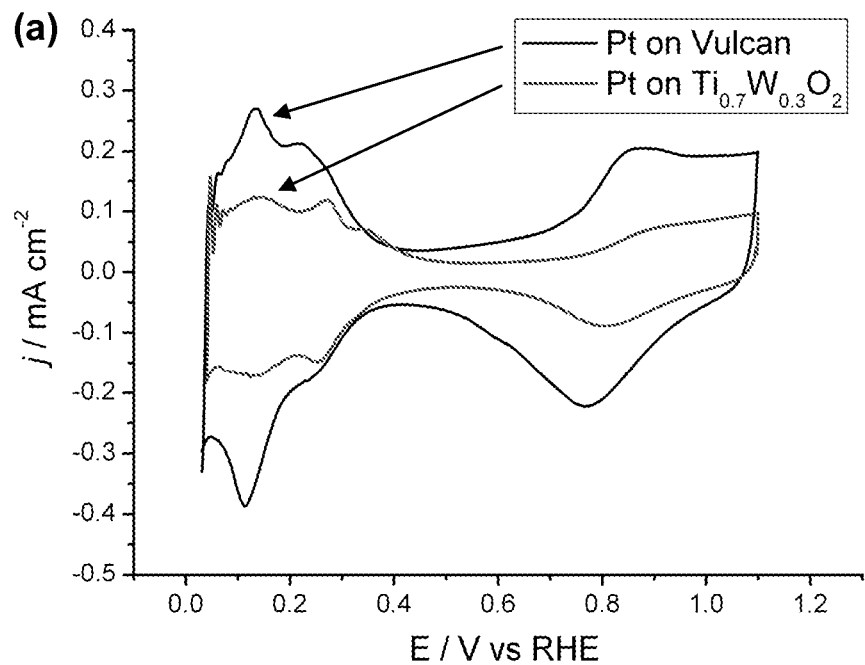
FIG. 5. Comparing platinized Vulcan (46 wt % Pt, 20.6 $\mu g_{Pt}/cm^2$, 61 $m^2_{Pt}/g_{Pt}$) and $Ti_{0.7}W_{0.3}O_2$ (39 wt % Pt, 34.6 $\mu g_{Pt}/cm^2$, 24 $m^2_{Pt}/g_{Pt}$) (a) Cyclic voltammogram and (b) Oxygen reduction rates tested in an oxygen saturated solution using a rotating disk electrode (RDE). The active Pt specific surface area on the oxide was significantly lower than that of platinized Vulcan and the Pt mass-specific activity of the $Pt/Ti_{0.7}W_{0.3}O_2$ was within a factor of two of that of the Pt/Vulcan.

Nonetheless, after the deposition of Pt nanoparticles, the material showed a typical CV of Pt (FIG. 5a), in which the hydrogen and "oxide" electrosorption/desorption regions were clearly visible. The CV curves confirmed the presence of electrochemically active (i.e., electrically connected) Pt on the surface of the oxide; however, the electrochemically active surface area of Pt on $Ti_{0.7}W_{0.3}O_2$ (24 m$^2$/g Pt) was lower than that on Vulcan (61 m$^2$/g Pt). This could either be a result of insufficient electrical conductivity of $Ti_{0.7}W_{0.3}O_2$ (0.02 to 0.9 S/cm, vs. 2 S/cm for Vulcan) or due to aggregation of Pt particles. Although this Pt deposition technique is currently used for carbon black, it may still require optimization for oxide supports.

Figure 5B:
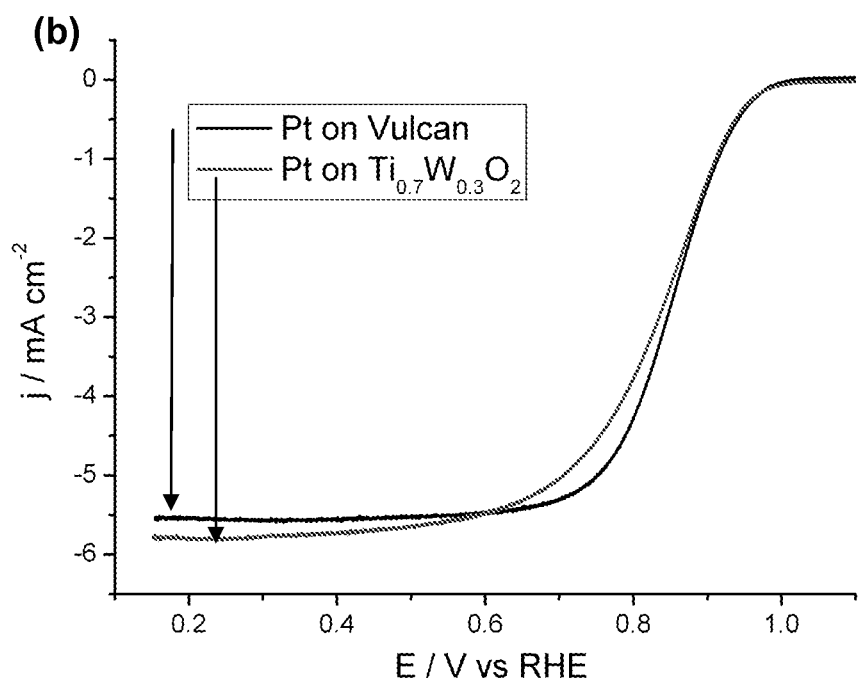

FIG. 5b shows positive-going scans of rotating-disk electrodes coated with Pt/$Ti_{0.7}W_{0.3}O_{0.2}$ and Pt/Vulcan. Roughly comparable currents were obtained for the two electrodes, but the Pt/$Ti_{0.7}W_{0.3}O_{0.2}$ electrode contained 1.7 times the amount of the Pt on the Pt/Vulcan electrode. From the data at 0.9 V RHE, corrected for the diffusion-limited currents at low potentials, one calculates Pt-mass activities of 0.05 A/mg$_{Pt}$ for the Pt/$Ti_{0.7}W_{0.3}O_{0.2}$ and 0.09 A/mg$_{Pt}$ for the Pt/Vulcan. The Pt area-specific activities were 200 μA/cm$^2_{Pt}$ for the Pt/$Ti_{0.7}W_{0.3}O_{0.2}$ and 150 μA/cm$^2_{Pt}$ for the Pt/Vulcan. Even though the electrode preparation and testing methods were not re-optimized for the oxide support, the oxide-supported catalyst showed initial activity roughly comparable to that of standard Pt/Vulcan.

Discussion:

It is expected that mixed doping with two or more different metals (say M and M') will be possible if the dioxides of the metals are separately soluble in $TiO_2$. For example, $Ti_{1-(x+y)}Nb_xW_yO_2$ should readily form since both individual dopants can be included in $TiO_2$ at a very high level. Indeed, such multiply doped materials may have a superior combination of oxidation/corrosion resistance and conductivity.

Finally, we have found that $TiO_2$ cannot be appreciably doped with transition metals that normally exhibit oxidation states of 3+ or below, as have others. However, $Ti_{1-x}W_xO_2$ can be doped with such elements. We find that the maximum content of such substitution occurs when the W is oxidized to 5+. For example, we have prepared single phase rutile-structure materials such as $Ti_{0.7}W_{0.15}Cr_{0.15}O_2$ and $Ti_{0.7}W_{0.2}Fe_{0.1}O_2$, that contain $Cr^{3+}$ and $Fe^{2+}$, respectively.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. Conducting metal oxide and/or metal nitride nanoparticles,
   wherein the metal oxide comprises a metal selected from titanium, niobium, tantalum, tungsten and combinations thereof, and oxygen,
   wherein the metal nitride comprises a metal selected from titanium, niobium, tantalum, tungsten, zirconium, and combinations thereof, and nitrogen,
   wherein the metal oxide nanoparticles have at least one metal that has at least one valence electron available for conduction,
   wherein the nanoparticles have a conductivity of at least 0.5 S/cm,
   wherein the nanoparticles have a rutile structure, and
   wherein the length of the longest axis of the nanoparticles is 20 nm to 200 nm.

2. The conducting metal oxide and/or nitride nanoparticles of claim 1, wherein the metal oxide further comprises a metal selected from vanadium, molybdenum, ruthenium, tin, iron, chromium, manganese, nickel, cobalt and combinations thereof.

3. The metal oxide and/or nitride nanoparticles of claim 2, wherein the nanoparticles have a composition represented as $Ti_{1-x}M_xO_2$, wherein M is a metal selected from tungsten, vanadium, niobium, tantalum, tin and ruthenium, wherein x is from 0.001 to 0.6.

4. The metal oxide and/or nitride nanoparticles of claim 2, wherein the nanoparticles have a composition represented as $Ti_{1-x-y}M_xM'_yO_2$, wherein M and M' are different metals and are selected from tungsten, vanadium, niobium, tantalum, tin and ruthenium, wherein x is from 0.01 to 0.5, and wherein y is 0.01 to 0.5.

5. The metal oxide and/or nitride nanoparticles of claim 2, wherein the nanoparticles have a composition represented as $Ti_{1-x-y}M_xA'_yO_2$, wherein M is tungsten and A' is a metal selected from chromium, manganese, iron, cobalt, and nickel, wherein if A' is chromium x is greater than or equal to y and x+y is less than 0.4, wherein if A' is manganese, iron, cobalt, or nickel x is greater than or equal to 2y and x+y is less than 0.4.

6. The conducting metal oxide and/or nitride nanoparticles of claim 1, wherein the metal nitride further comprises molybdenum.

7. The metal oxide and/or nitride nanoparticles of claim 6, wherein the nanoparticles have a composition represented as $Ti_{1-x}Mo_xN$, $Ti_{1-x}W_xN$ or $Nb_{1-x}W_xN$, wherein x is from 0.01 to 0.50.

8. A porous conducting material comprising agglomerates of the conducting metal oxide and/or nitride nanoparticles of claim 1, wherein the length of the longest axis of the agglomerates is 20 nm to 10 microns,
   wherein the material has pores and the longest axis of the pore opening is 50 to 500 nm,
   wherein the material has a conductivity of at least 0.5 S/cm, and
   wherein the nanoparticles have a rutile structure.

9. The porous conducting material of claim 8, wherein the metal oxide of the conducting metal oxide and/or nitride nanoparticles of claim 1 further comprise a metal selected from vanadium, molybdenum, ruthenium, tin, iron, chromium, manganese, nickel, cobalt and combinations thereof.

10. The porous conducting material of claim 8, wherein the metal nitride of the conducting metal oxide and/or nitride nanoparticles of claim 1 further comprise molybdenum.

11. The porous conducting material of claim 8, wherein the material has at least 50% porosity.

12. The porous conducting material of claim 11, wherein the material has 65% to 85% porosity.

13. The porous conducting material of claim 8, wherein the length of the longest axis of the agglomerates is 50 nm to 1 micron.

14. The porous conducting material of claim 8, wherein the material further comprises platinum.

15. The porous conducting material of claim 14, wherein the platinum is disposed on the surface of the material.

16. A fuel cell comprising an electrode comprising the porous conducting material of claim 8.

17. The fuel cell of claim 16, wherein the metal oxide of the porous conducting material further comprises a metal selected from vanadium, molybdenum, ruthenium, tin, iron, chromium, manganese, nickel, cobalt and combinations thereof.

18. The fuel cell of claim 16, wherein the metal nitride of the porous conducting material further comprises molybdenum.

* * * * *